US005387783A

United States Patent [19]

Mihm et al.

[11] Patent Number: 5,387,783

[45] Date of Patent: Feb. 7, 1995

[54] METHOD AND APPARATUS FOR INSERTING AND PRINTING BARCODED ZIP CODES

[75] Inventors: Terrance S. Mihm; Douglas Schmidt, both of La Crosse, Wis.

[73] Assignee: PostalSoft, Inc., LaCrosse, Wis.

[21] Appl. No.: 56,525

[22] Filed: Apr. 30, 1993

Related U.S. Application Data

[63] Continuation-in-part of Ser. No. 876,627, Apr. 30, 1992, abandoned.

[51] Int. Cl.[6] ................ G06F 15/20

[52] U.S. Cl. ................ 235/375

[58] Field of Search ................ 235/375; 382/1, 7; 209/546, 583, 584, 900

[56] References Cited

U.S. PATENT DOCUMENTS

| | | | |
|---|---|---|---|
| 4,317,030 | 2/1982 | Berghell et al. | 209/900 |
| 4,632,252 | 12/1986 | Haruki et al. | 209/546 |
| 4,641,753 | 2/1987 | Tamada . | |
| 4,725,718 | 2/1988 | Sansone et al. | 235/375 |
| 4,752,675 | 6/1988 | Zetmeir | 235/375 |
| 4,778,062 | 10/1988 | Pavie et al. . | |
| 4,965,829 | 10/1990 | Lemelson . | |
| 4,982,785 | 12/1990 | Kikuda | 235/375 |
| 5,031,223 | 7/1991 | Rosenbaum et al. . | |
| 5,104,681 | 4/1992 | Sansone | 209/584 |
| 5,189,180 | 10/1992 | Feiler | 235/375 |
| 5,237,156 | 8/1993 | Konishi et al. | 235/375 |

FOREIGN PATENT DOCUMENTS

| | | | |
|---|---|---|---|
| 2591512 | 6/1987 | France | 209/546 |
| 8501150 | 11/1986 | Germany | 209/546 |
| 2945386 | 5/1980 | Japan | 209/584 |

OTHER PUBLICATIONS

Article From "Toshiba Review" No. 118 (Nov.-Dec. 1978) By Kikuno, Osawa and Yoshimura "Fully Automatic Mail Processing System For Hungarian Post Office".

Advertisement from PC World dated Oct. 1991, regarding Address Express printing envelopes.

Advertisement from PC Magazine, August 1991, p. 199, regarding AddressWriter.

*Primary Examiner*—Raymond A. Nelli

*Attorney, Agent, or Firm*—Leydig, Voit & Mayer, Ltd.

[57] ABSTRACT

A system is disclosed for inserting barcode graphics information representing a complete zip code. The system receives a document containing a street address from a wordprocessor via a data transfer in accordance with printer interface protocols. The system locates the address within the document and thereafter consults an index of ZIP CODES corresponding to street addresses. If the system is able to identify a correct, complete ZIP CODE in the index for the address contained within the document, then a barcode representation of that ZIP CODE is thereafter calculated according to postal service regulations. The system then generates graphics data for the barcode representation of the ZIP CODE and inserts the graphics data into the electronic representation of the document. The document, including the barcode graphics, is thereafter transferred to a suitable printer.

20 Claims, 10 Drawing Sheets

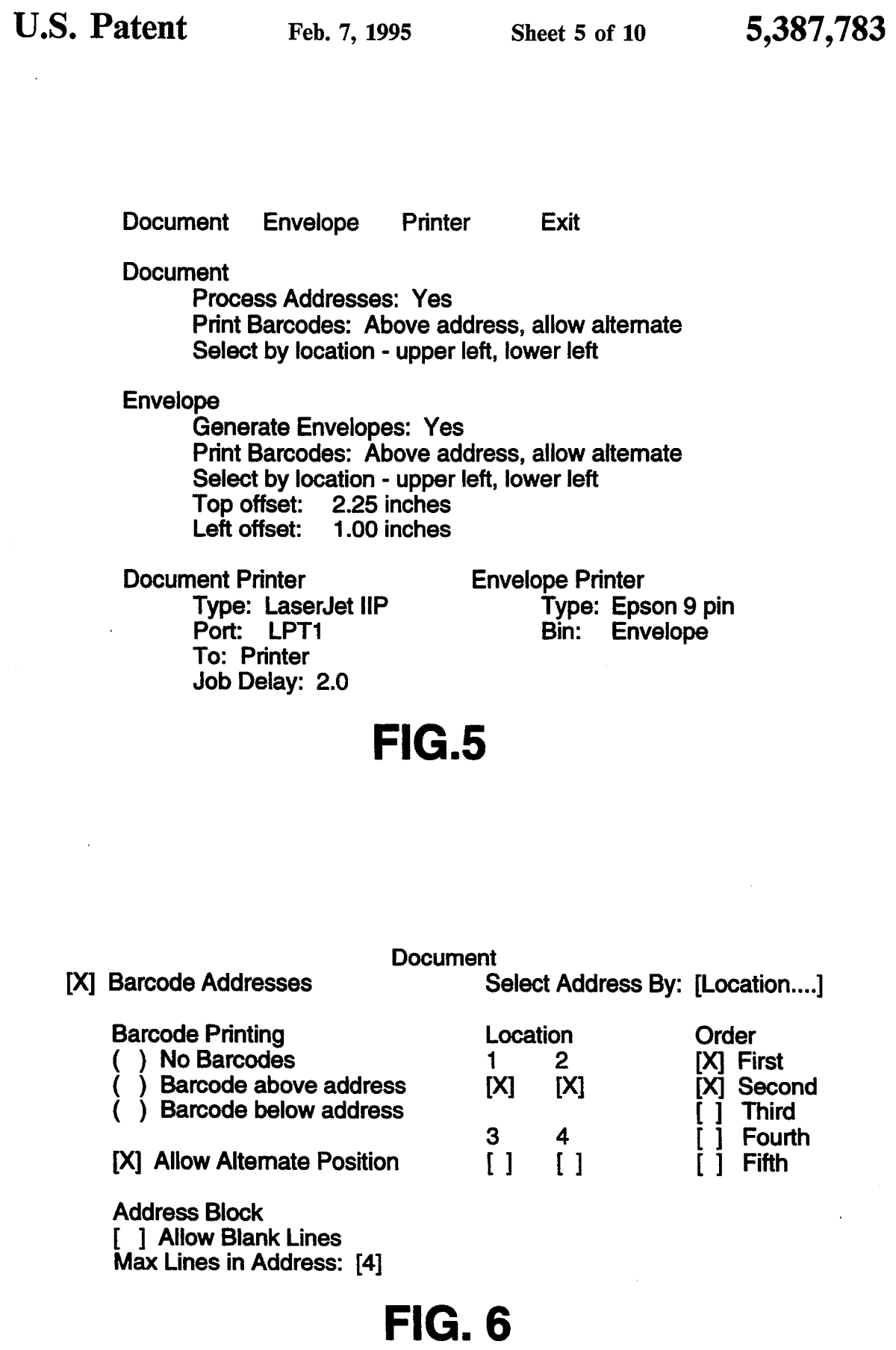

Document Envelope Printer Exit

Document
Process Addresses: Yes
Print Barcodes: Above address, allow alternate
Select by location - upper left, lower left Envelope
Generate Envelopes: Yes
Print Barcodes: Above address, allow alternate
Select by location - upper left, lower left
Top offset: 2.25 inches
Left offset: 1.00 inches Document Printer
Type: LaserJet IIP
Port: LPT1
To: Printer
Job Delay: 2.0

Envelope Printer
Type: Epson 9 pin
Bin: Envelope

FIG.5

Document

[X] Barcode Addresses

Barcode Printing
( ) No Barcodes
( ) Barcode above address
( ) Barcode below address

[X] Allow Alternate Position

Address Block
[ ] Allow Blank Lines
Max Lines in Address: [4]

Select Address By: [Location....]

Location
1 2
[X] [X]

3 4
[ ] [ ]

Order
[X] First
[X] Second
[ ] Third
[ ] Fourth
[ ] Fifth

FIG. 6

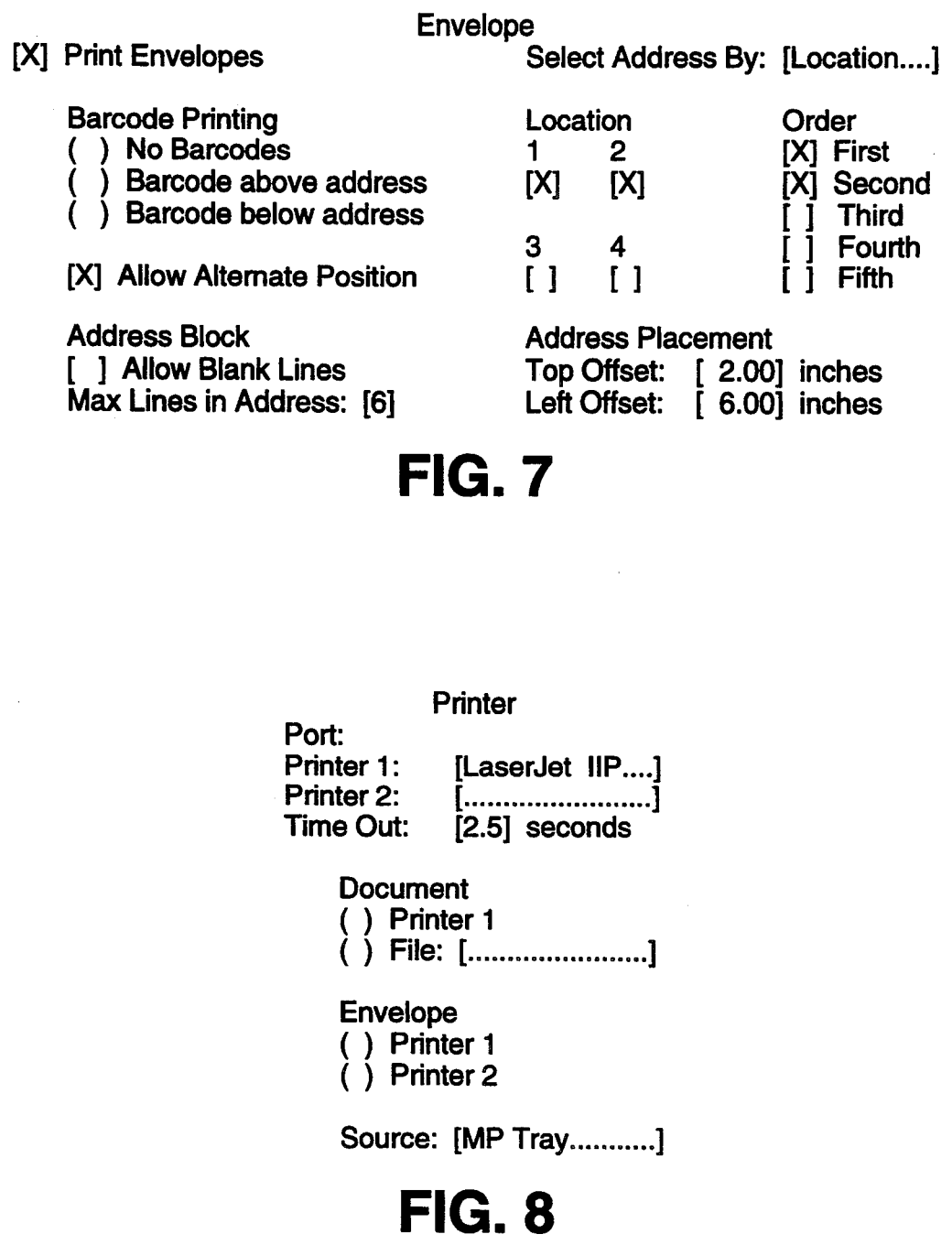

Envelope

[X] Print Envelopes

Barcode Printing
( ) No Barcodes
( ) Barcode above address
( ) Barcode below address

[X] Allow Alternate Position

Address Block
[ ] Allow Blank Lines
Max Lines in Address: [6]

Select Address By: [Location....]

| Location | | Order |
|---|---|---|
| 1 | 2 | [X] First |
| [X] | [X] | [X] Second |
| | | [ ] Third |
| 3 | 4 | [ ] Fourth |
| [ ] | [ ] | [ ] Fifth |

Address Placement
Top Offset: [ 2.00] inches
Left Offset: [ 6.00] inches

FIG. 7

Printer

Port:
Printer 1: [LaserJet IIP....]
Printer 2: [..........................]
Time Out: [2.5] seconds Document
( ) Printer 1
( ) File: [.........................]

Envelope
( ) Printer 1
( ) Printer 2

Source: [MP Tray...........]

FIG. 8

| Customer Computer | | Data Direction | PostalSoft MailCoder | |
|---|---|---|---|---|
| Strobe | pin 1 | → | pin 1 | Strobe |
| Data 0 | pin 2 | → | pin 2 | Data 0 |
| Data 1 | pin 3 | → | pin 3 | Data 1 |
| Data 2 | pin 4 | → | pin 4 | Data 2 |
| Data 3 | pin 5 | → | pin 5 | Data 3 |
| Data 4 | pin 6 | → | pin 6 | Data 4 |
| Data 5 | pin 7 | → | pin 7 | Data 5 |
| Data 6 | pin 8 | → | pin 8 | Data 6 |
| Data 7 | pin 9 | → | pin 9 | Data 7 |
| Acknowledge | pin 10 | ← | pin 10 | Acknowledge |
| Busy | pin 11 | ← | pin 11 | Hardware Busy |
| Out of Paper | pin 12 | | pin 12 | Paper Empty |
| Select | pin 13 | ← | pin 13 | Select |
| Auto Feed | pin 14 | → | pin 14 | Auto Feed |
| Error | pin 15 | ← | pin 15 | Error |
| Reset Printer | pin 16 | → | pin 16 | Initialize |
| Select In | pin 17 | → | pin 17 | Select In |
| Ground | pin 18-25 | | pin 18, 20, 22, 24, 25 | Ground |
| | | | pin 21 | Test 1 |
| | | | pin 23 | Test 2 |
| | | | pin 17 | Test 3 |
| | | | pin 19 | Test 4 |

FIG. 10

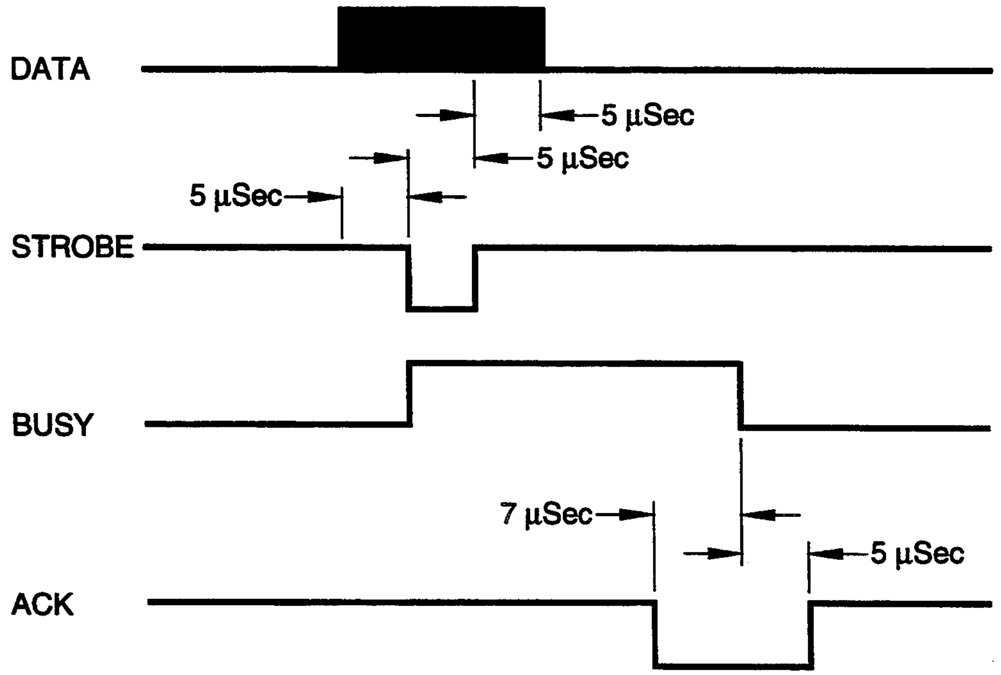

FIG. 12

METHOD AND APPARATUS FOR INSERTING AND PRINTING BARCODED ZIP CODES

This is a continuation-in-part of co-pending application Ser. No. 07/876,627 filed on Apr. 30, 1992 now abandoned.

AREA OF THE INVENTION

This invention relates generally to barcoding systems for printing a postal service barcode on a document in order to facilitate automated handling of mail. More particularly, this invention relates to systems for inserting barcoded ZIP CODE information into an electronically encoded document in accordance with information contained in the document prior to printing the document. The document, including the barcode, is thereafter printed out on a printing device.

BACKGROUND OF THE INVENTION

Barcoding pieces of mail has become a valuable addition to the United States Postal Service (USPS). Barcoding enables mail sorting machines to rapidly sort mail using the barcoded ZIP CODE printed on the mail. This allows the USPS to route mail from a mailer to a receiver more efficiently (thus reducing costs of mailing) and more quickly since the machines are capable of sorting mail according to the barcoded ZIP CODE many times faster than a human reading the numerical ZIP CODE.

Recently, the USPS has adopted new ZIP CODES which contain more detailed destination information than the original five-digit ZIP. One new form of ZIP CODE ("ZIP+4") contains an additional four digit extension which generally identifies an address within a side of a residential block. A further enhanced ZIP CODE system utilizes 11-digit ZIP CODES to specify a point of delivery.

In order to encourage the use of the barcoded ZIP CODES, the USPS now provides discounts for mailers who include a barcoded ZIP+4 ZIP CODE or the more recent 11-digit delivery point ZIP CODE on their mail.

It is known to print barcoded ZIP CODES on pieces of mail prior to mailing by means of a machine equipped with a scanner for sensing the ZIP CODE in numeral form. The scanner in conjunction with pattern recognition systems identifies a ZIP-code in numeral form, formulates an appropriate barcode in accordance with the universal standard encoding scheme adopted by the USPS, and prints the barcode on the piece of mail from which the numerical ZIP CODE is sensed.

It is also known to locate a ZIP+4 numerical ZIP CODE within an electronically encoded document and to thereby generate and insert barcode graphics data into the document based upon the actual 9-digit ZIP CODE located by the barcoding system.

Though many persons and companies have address databases which contain the street address and 5 digit ZIP CODE for a given addressee, the relatively new nine digit ZIP+4 and eleven digit ZIP CODES are not always available.

In addition, a risk exists that a clerical error may occur in typing a ZIP CODE into a document. This error, if not detected, will carry through to the barcoded ZIP CODE when error detection mechanisms are not provided. When coupled with the automated sorting mechanism for barcoded mail, a clerical error such as the one described above results in mail containing the erroneous ZIP CODE to be sorted and routed to an improper location. The improper location could be as close as a block away or as far as across the country.

A complete ZIP CODE specifies the most accurate routing information available and desired by the mailer of a mail piece for sending the mail piece to a particular destination. Including a correct and complete barcoded ZIP CODE on a piece of mail allows mailers to take advantage of the cost savings and speed of delivery provided by automated routing of barcoded mail pieces. Therefore, a great value is attributable to the ability of mailers to easily adapt to changes in the ZIP CODE system and to thereby include the most up-to-date, complete and correct barcoded ZIP CODE available for a given destination specified on a piece of mail.

SUMMARY OF THE INVENTION

It is a general object of the present invention to improve the speed, accuracy and cost efficiency of routing mail from a source to an intended destination.

It is another object of the present invention to append barcode graphics to either an envelope, mailing sticker, or letter with essentially equal ease.

It is an object of the present invention to provide a means to append complete barcoded ZIP CODE graphics data to an electronically encoded document for printing on an output device. The barcoded ZIP CODE being suitably placed upon the document to enable detection of the barcode by the automatic sorting mechanisms utilized by the post office.

It is a further object of the present invention to provide a correct, complete barcode corresponding to a street address contained in a document.

It is another object of the present invention to enable a sender to specify the position of the barcode graphics on a printed document.

It is an object of the present invention to enable a user to define the scope of the barcoder system's search for electronically encoded addresses.

It is a more specific object of the present invention to enable a user to define where the barcoding system searches for addresses in an electronically encoded document.

It is yet another object of the present invention to enable a user to flexibly define the output device to which the modified electronically encoded document is routed after barcode graphics are appended by the barcoder system.

It is still another object of the present invention to provide a mail barcoding system to communicatively interface with existing wordprocessing systems in a manner transparent to the wordprocessing hardware and the printer of the wordprocessing system.

In remedy of the perceived problems and needs in the area of automated mailing in accordance with standard barcoded ZIP CODES, a system is provided for receiving a print-ready document containing one or more mailing addresses from a word processor. The system comprises means for receiving a print-ready document encoded as a plurality of bit patterns containing at least one street address. A microprocessor-based device identifies a bit pattern within the set of bit patterns corresponding to a street address in accordance with user defined parameters. The device retrieves the proper complete ZIP CODE from an index which associates the street addresses with complete ZIP CODES.

The device thereafter inserts into the encoded document an additional bit pattern representing barcode graphics data corresponding to the complete ZIP CODE such that a barcoded ZIP CODE for the street address will be printed at a predetermined area of the document. The position of the barcode is defined by a set of user specified parameters and the availability of physical space on the document for inserting barcode graphics. The system also includes means for transmitting the modified encoded document, including the appended bit pattern representing the barcode graphics data, to an output device for printing or displaying the document.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 5 is an illustration of the main menu display for barcode user options;

FIG. 6 is an illustration of the sub-menu display for document options;

FIG. 7 is an illustration of envelope options;

FIG. 8 is an illustration of the sub-menu display for printer options.;

FIG. 10 is a summary of the pin connections of the communicatively coupled parallel ports of the barcoder and the personal computer;

FIG. 12 is a timing diagram for transferring data between the personal computer and the barcoder.

DETAILED DESCRIPTION OF THE INVENTION

Figure 1:
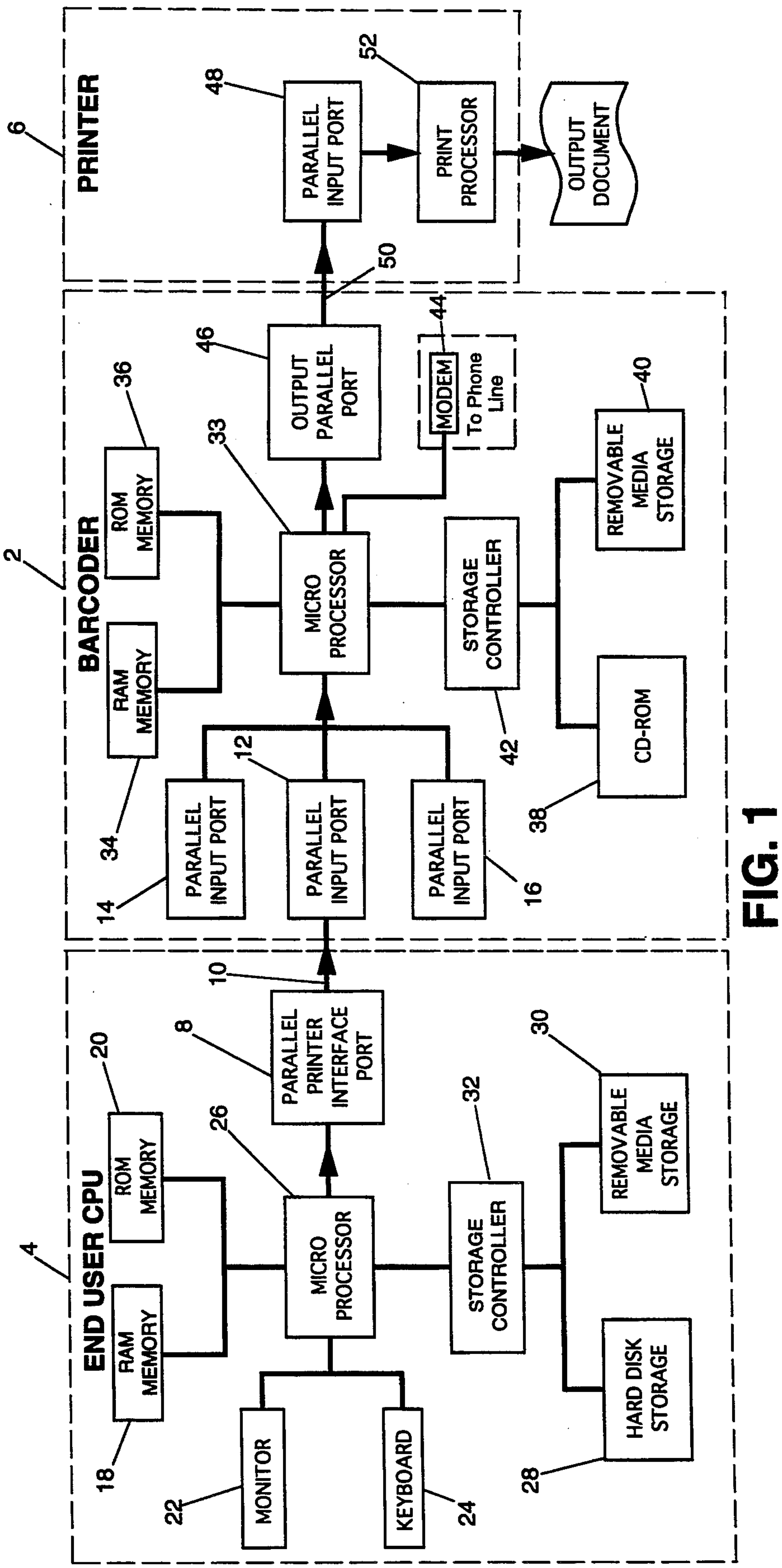
FIG. 1 is a block diagram of a computer network including the barcoder unit interposed between a personal computer and a printing device.

The present invention accomplishes the above and other objects through intelligent computer hardware disposed between a wordprocessing system and a printing device (referred to hereinafter as "the barcoder"). The barcoder selectively intercepts documents transmitted by the personal computer to the printer, searches the document in predetermined locations for addresses, and places barcode graphics information representing the complete ZIP CODE for a detected address in pre-determined locations within the document in accordance with user-specified parameters. The complete ZIP CODE is provided based upon the street address detected by the search procedure performed by the barcoder. In the United States Postal Service ZIP CODE system, a complete ZIP CODE includes at least the 9-digit ZIP+4 code. However, a more recent 11-digit delivery point barcode is also within the intended definition of "complete" ZIP CODE as used herein.

The barcoder is constructed from standard off-the-shelf computer components. In fact, one may use another personal computer with appropriate input/output programming, a publicly available ZIP CODE data base, and appropriate database search algorithms known to those skilled in the art in order to carry out the present invention. In the preferred embodiment, the input port of the barcoder hardware is modified to provide a better interface between the personal computer and the barcoder.

The barcoder of the present invention searches one or more predetermined locations within an electronically encoded document received from the personal computer until a street address is located. The locations searched within the document are determined by user specified parameters. These parameters are described in greater detail below.

After detecting a street address, the barcoder converts the street address into a standardized form in accordance with post office guidelines. This enables the barcoder to search a database within the barcoder system containing a corresponding complete numerical ZIP CODE for a given standardized street address and to determine the correct complete ZIP CODE for the street address detected by the barcoder. If an incorrect or five-digit ZIP CODE is included in the detected street address in the document, then the barcoder will ignore this incorrect or incomplete ZIP CODE and supply a complete correct ZIP CODE retrieved from the database for purposes of generating barcoded ZIP CODE graphics.

After the barcoder identifies the complete and correct ZIP CODE for the street address, the barcoder generates barcode graphics data corresponding to the correct complete ZIP CODE. The encoding scheme for converting the numerical ZIP CODE into a barcoded ZIP CODE suitable for reading by barcode readers is provided by the post office and is well known to those familiar with the barcoding of mail. The barcoder appends barcode graphics data to the received document at a position determined by user specified parameters described in greater detail hereinafter. After inserting proper barcode graphics information, the barcoder forwards the modified electronically encoded document to an output device for printing or displaying the modified document.

Referring now to the drawings, FIG. 1 shows a functional block diagram of an exemplary configuration of the barcoder 2 coupled to a personal computer 4 and a printer 6. As will be appreciated by one of ordinary skill in the art, in other embodiments of the invention a plurality of personal computers or other sources for electronically encoded documents may be coupled to the barcoder 2. In addition, more than one printer may be coupled to the barcoder 2. Such a case exists when a second printer (not shown) is attached for printing envelopes. The printer interface port 8 of the personal computer 4 is coupled to an input port 12 via line 10 which is a parallel printer cable or other suitable transmission media.

The present invention may be utilized in a number of network configurations. A set of networked user terminals may be coupled to a single printing bus which is then coupled to the input port 12. In FIG. 1, the barcoder 2 contains for illustrative purposes two additional input ports 14 and 16 which in an alternative network configuration may be coupled to additional personal computers in a manner known to those of ordinary skill in the art. The number of personal computers, or other sources of electronically encoded documents, coupled to the barcoder 2 and the number of input ports to the barcoder 2 are design considerations. Thus, it is within the scope of the present invention to alter the number of personal computers coupled to the barcoder 2 in order to conform to the specific needs of a user.

In the preferred embodiment, the personal computer 4 includes in well known manner a RAM memory 18 and ROM memory 20 for storing user application programs and operating system programs. The personal computer 4 also includes a monitor 22 and a keyboard 24 providing a user interface to the personal computer 4 for generating electronic documents, specifying operating parameters for the operation of the barcoder 2, and commencing the transmission of electronic documents from the personal computer 4 to the barcoder 2 in ready-to-print form. The operation of the personal computer 4 is controlled and executed by the microprocessor 26. The personal computer also includes secondary storage media containing in optional configuration a hard disk drive 28 and a removable disk drive 30 coupled to the microprocessor 26 through a secondary storage controller 32. The previous description of a personal computer 4 is merely illustrative. Other sources of the electronically encoded documents received by the barcoder 2 will be known to those of ordinary skill in the art in view of the disclosure of the invention contained herein.

Turning now to the barcoder 2, there is included a microprocessor 33 for coordinating and assisting in the execution of the receive, identification, search, insert and transmission functions of the barcoder 2 described herein. In addition to the aforementioned input ports 12, 14 and 16, the barcoder 2 includes additional computer hardware for storing application and system programs in RAM memory 34 and ROM memory 36. A Compact Disk (CD) ROM memory 38 is coupled to the microprocessor 33. The CD-ROM memory 38 provides access to a database of complete ZIP CODES associated with street addresses for a desired mailing destination. Additional secondary storage devices such as a removable disk storage device 40 are included to provide an easy means for loading applications programs into the barcoder 2. Other secondary storage media such as a hard disk drive (not pictured) may be added if desired. The CD-ROM 38 and the removable disk storage device 40 are coupled to the microprocessor 33 through a secondary storage controller 42. The barcoder 2 may also include a modem 44. The modem 44 provides an optional link to other sources of the ZIP CODE database if such a need should arise. The modified electronically encoded documents are transmitted from the barcoder 2 by means of an output port 46. As previously explained, additional printing devices may be coupled to the barcoder 2. Thus, additional output ports, equivalent to output port 46, may be added.

In the embodiment of the present invention illustrated in FIG. 1, the printer 6 receives the modified document from the barcoder 2 by means of an input port 48. The input port 48 is coupled to the output port 46 of the barcoder 2 via line 50. A print processor 52 in conjunction with other known printer hardware and software, converts the electronically encoded document received from barcoder 2 into a hard, paper copy of the document in a manner known to those skilled in the area of printers. The appropriate commands for printing barcode graphics which were added to the original electronically encoded document received by the barcoder are determined by the type of printer actually used. These commands are also known by those of ordinary skill in the area of document printers.

Figure 9A:
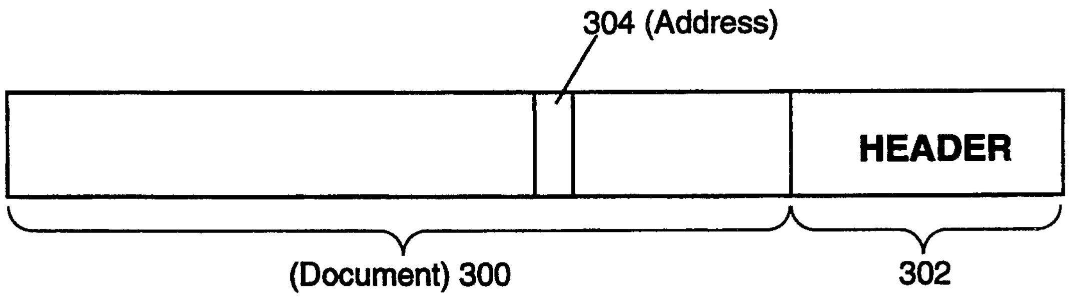
FIGS. 9*a* and 9*b* are an illustrative set of bit patterns corresponding to a document received and a document transmitted from the barcoder.

Turning now to FIG. 9*a*, a schematic drawing is provided of the electronically encoded document consisting of a plurality of bit patterns including a sequence of bit patterns representing a document body 300 and a sequence of bit patterns representing a header 302 received by the barcoder 2 from the personal computer 4. The bit pattern comprising the header record 302 specifies the parameter values for a set of barcoder options described hereinafter. The document body 300 contains at least one address bit pattern 304.

The barcoder 2, in processing the bit patterns 300 and 302 received from the word processor 4, removes the header record bit pattern 302 from the concatenated bit patterns 300 and 302. The barcoder 2 identifies a bit pattern 304 corresponding to a street address. Next, the barcoder 2, consults a database described hereinafter to retrieve a correct complete ZIP CODE from an index of ZIP CODES. The complete ZIP CODE is thereafter converted into a sequence of bit patterns comprising the graphics data for a barcoded ZIP CODE corresponding to the complete ZIP CODE.

Figure 9B:
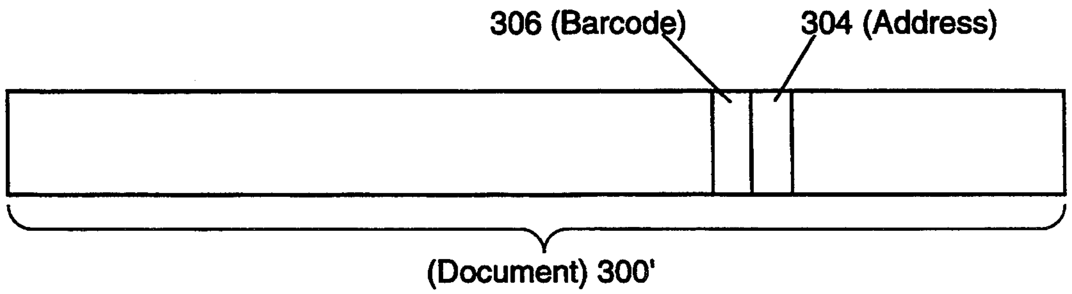

FIG. 9*b* is a schematic representation of the sequence of bit patterns 300′ representing the modified document body transmitted from the barcoder 2 to the printer 6. The barcoder 2 inserts a bit pattern 306 corresponding to the complete barcoded ZIP CODE into the set of bit patterns of the document 300 to create a new set of bit patterns 300′. The bit pattern 306 causes the printer 6 to print the barcode graphics on a predetermined location on a printed document when the printer 6 processes the bit patterns 300′ of the modified document body.

Thereafter, the modified bit pattern 300′ is transmitted by the barcoder 2 to the printer 6 for printing out the electronically encoded document represented by the bit pattern 300′. In the illustrative embodiment in FIG. 9*b*, the barcode graphics bit pattern 306 is positioned after the alpha-numerical address bit pattern 304. The modified bit pattern 300′ is thereafter converted into a human-readable document containing text and the complete barcoded ZIP CODE.

Having completed the hardware description of the barcoder 2 and related system hardware, the process of entering appropriate control parameters for the barcoder 2 will now be described. The personal computer 4 contains a terminate and stay resident (TSR) program. The TSR is constantly present in the RAM memory 18 during regular operation of the personal computer 4 after the TSR has been installed in the personal computer 4. The TSR program is re-loaded from secondary storage during start-up of the personal computer 4 and is invoked by a pre-determined keystroke sequence entered at the keyboard 24 by the user of the barcoder system. The TSR program allows the user to select a set of values for control parameters for controlling the operation of the barcoder 2. Thereafter, the TSR creates a byte string containing the encoded parameter values referred to herein as the header 302. The header 302 containing the encoded control parameter values is appended to each document sent from the personal computer 4 to the barcoder 2 for processing. The length of the header 302 is merely a design consideration and longer or shorter headers may be used in other embodiments of the present invention. As explained above, the header 302 is removed by the barcoder 2 before forwarding the modified document to the printer 6 for printing.

The TSR program causes the personal computer to re-compile the header record each time the personal computer 4 sends a new print job for processing by the barcoder 2. The header record is transmitted at the beginning of each document transmission from the personal computer 4 to the barcoder 2. The header 302 represents a collection of barcoder options. These options are described hereinafter in conjunction with the menu screens depicted in FIGS. 5 to 8.

The screens depicted in FIGS. 5 to 8 are displayed on the monitor 22 during operation of the barcode parameter determination mode of the TSR. First, the header information instructs the barcoder 2 whether or not to insert barcode graphics data into the electronically encoded document. Second, the header specifies the position in the address field where the barcoder will insert the barcode graphics. Third, the header identifies the portions of the document where the barcoder should search for addresses to receive barcode encoding. Fourth, the header identifies where on the document the barcode should be inserted if the position is not explicitly determined by its position relative to the address field of the electronically encoded document. Fifth, the header designates the address block size (in lines). These options, as well as others, are discussed in greater detail below.

Turning to FIG. 5, when activated by the user, the TSR program prompts the user with a menu at the monitor 22 containing a set of four basic options: Document, Envelope, Printer, and Exit. Each of the first three menu options includes a display of the current parameter values attributable to the menu option to provide the user with a set of current parameter settings.

Turning now to FIG. 6, selection of the Document option causes the TSR to recall and display at the monitor 22 a menu containing a set of parameters to be designated by the user which relate to the barcoding of addresses contained in specified portions of a document. While in the Document sub-menu, the user may specify whether or not the barcoder 2 is to process a document received from the personal computer 4, whether the barcode graphics are to be inserted above an identified address block, whether the barcode graphics are to be inserted below the address, or whether the barcoder 2 is not to insert barcodes in the document even though the document will be processed by the barcoder 2.

The barcoder 2 requires a quarter inch vertical blank space in a document in which to insert a barcoded ZIP CODE. Therefore, the barcoder 2 will not insert barcode graphics into the document regardless of the user's instructions if sufficient space does not exist in the document for the barcode graphics to be printed. However, in addition to the above options, the user may allow the barcoder 2 to insert the barcode graphics beneath the address in a document if the required quarter inch space does not exist above the address or vice versa.

Another option which may be specified by a user while in the Document sub-menu is the position of the start of an address block since a search for an address beginning becomes a difficult task when faced with the multitude of formats for representing an address (including blank lines in the address block). Specifying the start of an address block ensures the proper identification of an address. The first attribute associated with this portion of the Document sub-menu is the allowance for blank lines in the address block. Blank lines typically arise in the context of mail merge documents wherein certain address fields—and thus lines—are blank. The second attribute designates the maximum number of lines in an address field. This option limits the barcoder's search for the beginning of an address.

In view of the barcoder 2's ability to divide the pages of a document into four equal quadrants, another parameter which the user may specify while in the Document sub-menu is the quadrant or quadrants of a page in which the barcoder 2 should search for an address. The user may designate a search which includes from one to all four quadrants of a page.

Alternatively, the user may request the barcoder 2 to append a barcode to a given address based upon the position of the address in respect to other addresses which appear in a document. The preferred embodiment allows the user to designate as many as five relative positions (first to fifth) in a document. In the preferred embodiment of the invention, the address search must be designated by quadrants or the relative positions—but not both. The user may also request the barcoder 2 to insert barcodes for every address encountered in a document.

Turning now to FIG. 7, the second sub-menu concerns options regarding the printing of barcode graphics on envelopes. First, the user may designate whether or not to print envelopes. The print envelope option should be disabled when the mailer is using an envelope which displays the barcode through the envelope window. Next, the user may designate whether the barcode will be inserted above or below the address or not at all in a manner analogous to the positioning of the barcode in the Document sub-menu. The option is also available for the user to permit the barcoder 2 to insert the barcode graphics above the address if sufficient space does not exist below the address for inserting the barcode graphics or vice versa.

In a manner equivalent to the procedure described above for setting certain parameters associated with the Document sub-menu, the Envelope sub-menu provides a means for the user to designate a certain address block size or configuration in order to facilitate the determination by the barcoder 2 of the beginning of a particular address. The user may also designate the manner of selection of an address for which the barcoder 2 will generate and insert a barcode. The selection of an address may be based upon the quadrant in which the address is located in a document or by the relative position in which the address appears in comparison to other addresses contained within a document in a manner analogous to the address selection parameter described above in conjunction with the Document sub-menu.

The envelope sub-menu contains, in addition to the above parameter options, a set of address placement parameters. The first placement parameter designates the offset from the top of an envelope. The second parameter designates the offset from the left edge of the envelope.

Turning now to FIG. 8, the final sub-menu in the preferred embodiment of the present invention concerns the designation of parameters to control printers. A first option available to the user in the Printer sub-menu is the choice of printer port. This option specifies the proper interface port 8 for transmitting the electronically encoded document, including the aforementioned header, from the personal computer 4 to the barcoder 2. Second, the user is prompted to designate the type of printer to which the barcoder 2 will eventually transmit the electronically encoded document after inserting proper barcode graphics data into the document. One may also designate a second printer type. This second printer will only print envelopes. Finally, the user specifies where the barcoder 2 is to route documents and envelopes. Documents may be routed to the first designated printer or a file (for troubleshooting). Envelopes may be routed to either the first or the second printer.

Designation of the above parameters causes the TSR to append a header record embodying the specified parameters onto every document sent by the personal computer 4 for printing at the printer 6. The barcoder 2, decodes the header record in every received document and performs the steps described below in accordance with the parameters designated by the header.

Figure 2:
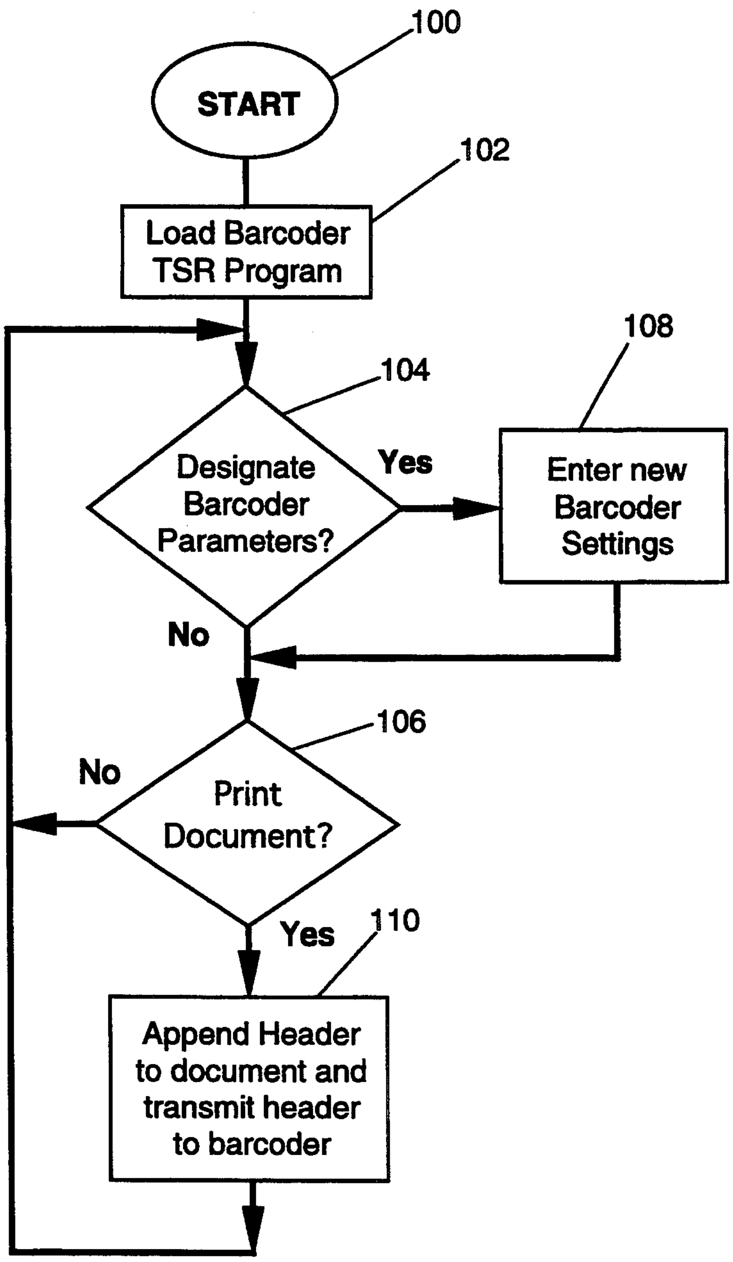
FIG. 2 is a flow chart illustrating the steps executed by a personal computer in order to initialize barcoder settings and transmit a document to a barcoder for processing.
Figure 3:
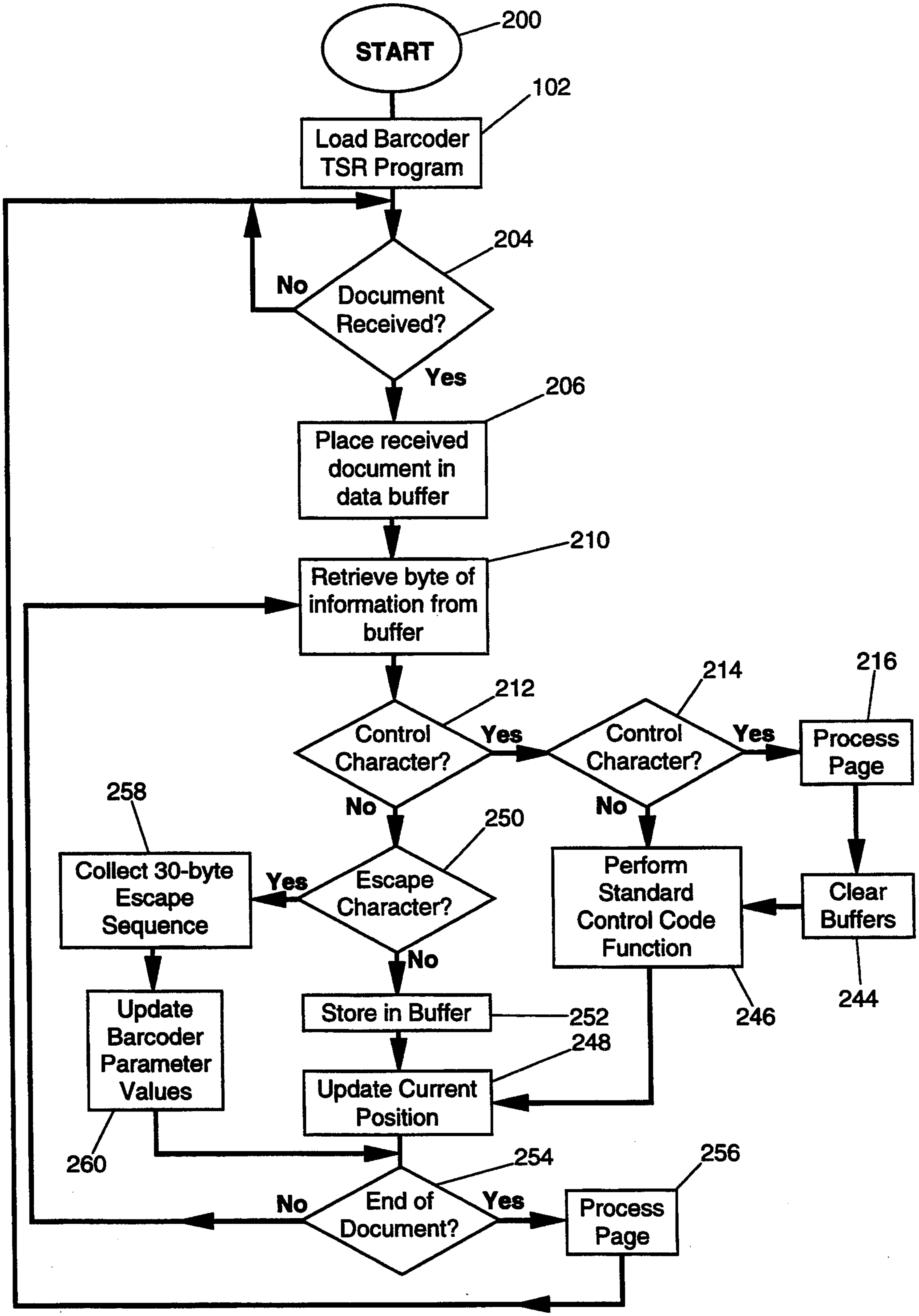
FIG. 3 is a flow chart illustrating the steps executed by a barcoder for initialization and operation of the barcoder.
Figure 4:
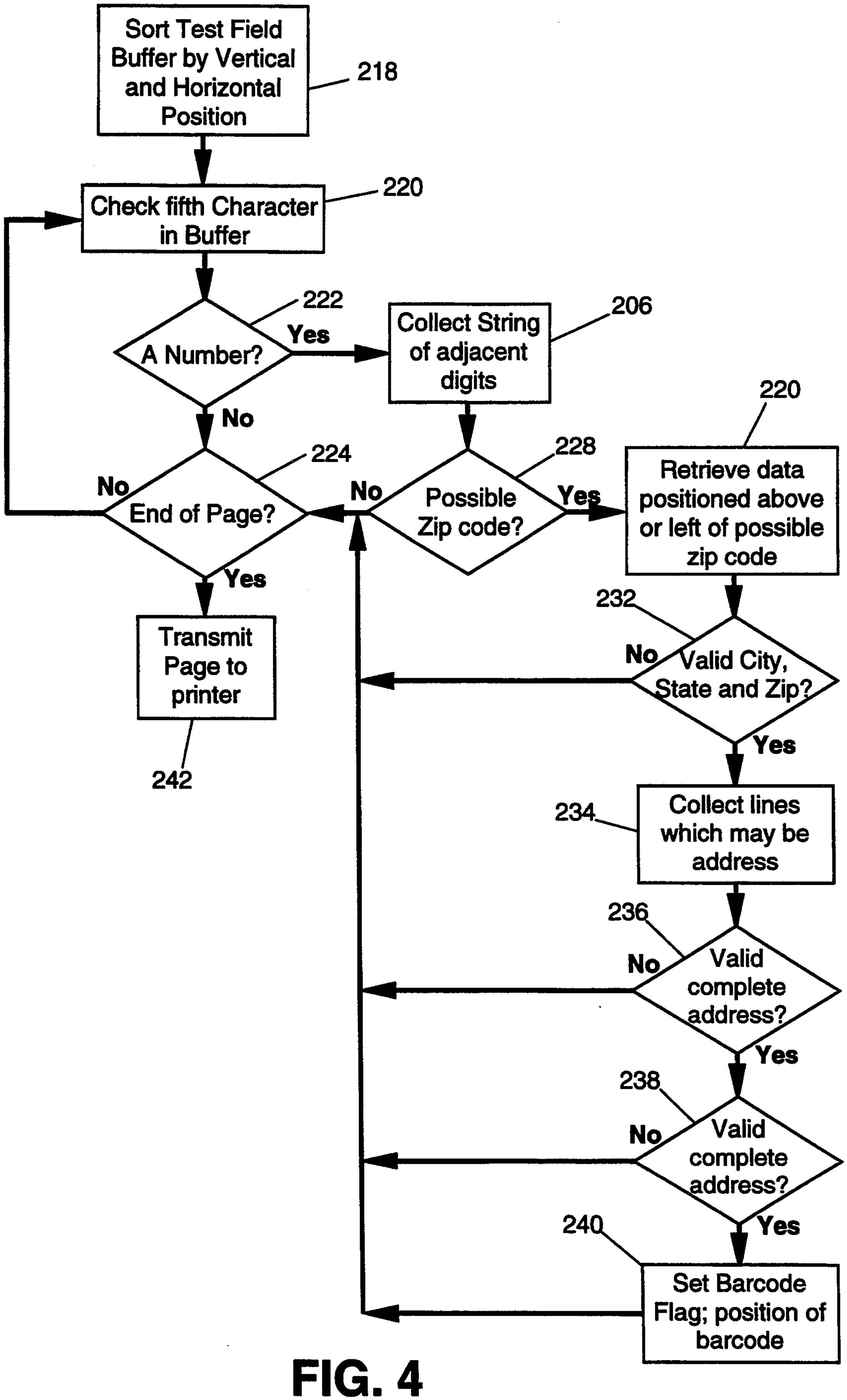
FIG. 4 is a flow chart illustrating the sub-steps for processing a page of text in the barcoder.

Having described the TSR program and the process of selecting parameters for inserting barcodes into a document transmitted by the personal computer 4 to the barcoder 2, the process of generating and inserting barcode graphics in a document will be described in conjunction with the flow charts depicted in FIG. 2 and FIGS. 3 and 4 illustrating the steps executed respectively by the personal computer 4 and the barcoder 2. In step 100, the user activates the personal computer 4. Thereafter, the barcoder TSR program is loaded into the RAM memory 18 during step 102. Once loaded, the TSR program is invoked by the user by means of a pre-determined set of key strokes on the keyboard 24. At step 104, the TSR program determines whether the user wishes to set or modify previously entered barcoder parameter values (described herein above). If the user does not wish to change the parameter values, then control passes to step 106. However, if the user has submitted a request to change the barcoder parameter values, then control passes to step 108.

During step 108, the user specifies the new parameter values for controlling the barcoder and the TSR incorporates the new values into the header record. After the user specifies the new barcoder parameter values, control passes to step 106 wherein the TSR program determines whether an application program running on the personal computer 2 has submitted a print request. If no print request is detected, control passes to step 104. However, if a print request is detected by the TSR, control passes to step 110 wherein the TSR program residing in the personal computer 4 causes a header record containing an encoded set of user specified parameter values to be appended to the document to be printed, and the electronically encoded header and document are transmitted to the barcoder 2 via line 10. Control thereafter passes to step 104.

Turning now to FIG. 3, a flow chart shows the steps executed by the barcoder 2. The barcoder 2 is started in step 200. In step 202 the barcoder 2 executes an initialization routine analogous to the start up routines for networked personal computers which are known to those skilled in the computer art. The initialization step 202 includes testing the essential system hardware, setting the barcoder 2 to default settings and resetting the communications ports thus readying the ports 12, 14 and 16 for receiving documents from the personal computer 4 and any other personal computers or devices communicatively coupled to the barcoder 2 for sending documents. The initialization procedure for the barcoder 2 as well as the procedure for the barcoder 2 receiving an encoded document from the personal computer 4 is discussed in detail below in association with the detailed description of the input port 12 illustrated in FIGS. 10 and 11.

During step 204 the barcoder 2 determines whether a document has been received at the input port 12. If no document has been received, then the barcoder 2 repeats step 204. If however, a document has been received, then control passes to step 206. At step 206, the entire document, including the header, is buffered for subsequent byte-by-byte processing by the barcoder 2.

Next, at step 210 the barcoder 2 sequentially retrieves a byte of information from the buffered document. During step 212, the barcoder 2 determines whether the byte of information is a control character.

If at step 212 the barcoder 2 determines that the current character is not a control code, control passes to step 250. At step 250, the barcoder 2 determines whether the character is an escape character thereby signalling the beginning of the header field. If the barcoder 2 determines at step 250 that the character is an escape character, control passes to step 258 wherein the barcoder 2 retrieves the header record from the receive buffer and stores the data in a separate barcoder control buffer. Next, at step 260, the barcoder 2 updates the barcoding control parameter values in accordance with the encoded user specifications obtained by the TSR described above. As previously mentioned these control values include, among other information, parameter values relating to the processes executed by the barcoder 2 to identify addresses in a document and the position at which the barcoder 2 will insert barcoded ZIP CODES corresponding to those addresses. After updating the barcode parameter values, control passes to step 254.

If the character is not an escape character, then control passes to step 252 wherein the character is stored in the text data buffer of the barcoder 2. Next, at step 248, the barcoder's position in the processed document is updated. Control then passes to step 254.

Returning to decision step 212, if the byte of information is a control character, control passes to step 214 where the barcoder 2 determines whether the current character is a form feed character. If the character is a form feed control character, then control passes to step 216 and the page of information is processed by the barcoder 2.

The sub-steps for completing the Process Page step 216 executed by the barcoder 2 are set forth in the flow chart shown in FIG. 4. In step 218 the barcoder 2 sorts the text field buffer by vertical position and horizontal position to determine the quadrant of the page in which the electronically encoded text resides when displayed as a page of text or printed out on paper. Next, at step 220 every fifth character is checked to determine whether the checked character is a number. The search procedure of step 220 may be modified in order to account for a different minimum length ZIP CODE or to account for ZIP CODES which include symbols other than numbers. If a number is identified in step 222, then control passes to step 224 where the barcoder 2 determines whether the end of the page has been reached. If the end of the page has not been reached, then control passes to step 220.

If a number is sensed at step 222, then control passes to step 226 where the barcoder 2 retrieves the string of digits adjacent to the number. Control then passes to step 228 where the barcoder 2 determines whether the string of numbers is a possible ZIP CODE. If the string cannot be a ZIP CODE, then control passes to step 224 described above. If the string of numbers is a possible ZIP CODE, then control passes to step 230.

At step 230 the barcoder 2 retrieves a limited set of data which would appear adjacently to the left and above the ZIP CODE in a printed document. Thus, at step 230, the barcoder 2 attempts to retrieve at least the city, state and ZIP CODE portion of the address. Next, at step 232 the barcoder 2 determines whether the city and state correspond to the ZIP CODE provided in the document. Step 232 is carried out by means of the Address Correction and Encoding ("ACE") system, publicly available from PostalSoft, Inc. 4439 Mormon Coulee Rd., La Crosse Wis. The ACE system and step 232 will be explained in detail below.

The ACE system receives as input address information for a given destination. The ACE system parses the address information. More specifically, the ACE system breaks the address down into street, city, state and ZIP CODE fields. Next, the ACE system standardizes the input. The ACE converts abbreviations and case, and removes punctuation and unnecessary spaces. At this point the converted address meets the format of the USPS directories.

After standardizing the input address, the ACE attempts during step 232 to match the city, state and ZIP CODE of the input file with a matching entry in the ACE database. ACE verifies the correct spelling of the city name and state abbreviation, and the correct, complete ZIP CODE corresponding to that city or area.

If the ZIP CODE does not correspond to the city and state, the ACE system attempts to resolve the difference by correcting for minor errors in the state name, city name, or ZIP CODE. However, if the ACE system is unable to resolve the error in the address, then control passes to step 224 and encoded ZIP CODE barcode graphics will not be inserted into the document corresponding to that particular address.

If a valid city, state and ZIP CODE combination is identified at step 232, then control passes to step 234 where additional lines of text are retrieved in order to assemble a complete street address. The scope of this search is controlled in part by the parameter values concerning the address format contained in the header field. These parameters were described above in conjunction with the description of the TSR. Control then passes to step 236.

At step 236 the ACE system in the barcoder 2 is invoked to identify the most complete ZIP CODE available for the address retrieved in step 234. The ACE searches for the street address in the ZIP CODE directory containing at least the zip+4 codes, but may also contain the 11-digit delivery point codes as well. With the zip+4 code database, the ACE is able to verify that an address is in a proper range of addresses or to assign a complete ZIP CODE containing at least 9 digits for a correct address which does not contain the zip+4 code. The delivery point code system affords even greater specificity either to verify a correct street address or to assign a more complete ZIP CODE for an address providing only a five or nine-digit ZIP CODE.

If the complete address is not valid (i.e. does not correspond to the ZIP CODE originally provided in the document) and the ACE system is unable to correct for the error in the address by providing a correct, complete ZIP CODE for the address provided, then control passes to step 224 without further attempt to obtain a valid complete barcode. In various alternative embodiments of the present invention, the ACE subsystem of the barcoder 2 may provide various levels of address correction and ZIP CODE supplementation capabilities. If the address is determined to be valid or correctable in step 236, then control passes to step 238.

At step 238 the barcoder 2 determines whether room exists within the document to insert a barcode representation of the ZIP CODE. As described above, the position of the barcode is determined by the user specified values contained in the header record generated by the TSR. If there is not sufficient room within the document for a barcode, then control passes to step 224. If there is sufficient room for inserting a barcode (one quarter inch), then control passes to step 240 where a barcode flag is set and the position of the barcode in the document is specified. Control thereafter passes to step 224.

If the end of a page is sensed at step 224, then control passes to step 242 and the buffered information for a page is transmitted from the barcoder 2 to the input port 48 of the printer 6 via line 50. During step 242, the barcoder 2 determines whether a barcode flag has been set for the page to be transmitted to the printer. If no barcode flag is set, then the page is transmitted to the printer 6 via line 50. If the barcode flag for a page is set, then the barcoder 2 generates a barcode for addresses specified in step 240 in accordance with the standards of the mail system. The barcoder 2 thereafter inserts proper barcode graphic data into the document in the positions specified in step 240 in a manner known to those of ordinary skill in the art. The entire page, including the barcode graphics, is then transmitted to the printer 6 via line 50.

Returning now to FIG. 3, after the page has been processed in step 216, control passes to step 244 where the barcoder 2 clears the buffers associated with the processed page. Thereafter, control passes to step 246 wherein the barcoder 2 executes well known procedures for processing a form feed control character which causes the printer 6 to eject the page.

If the barcoder 2 determines at step 214 that the control character is not a form feed character, then control passes to step 246 wherein the barcoder 2 executes the function associated with the control character. After completion of step 246, control then passes to step 248 wherein the barcoder's position in the processed document is updated. Control of the barcoder's operation then passes to step 254.

If at step 254, the barcoder 2 has not reached the end of the document, then control passes to step 210 and another byte of data is retrieved from the receive buffer of the barcoder 2.

If the barcoder 2 has reached the end of the document, then control passes to step 256 wherein the final page of the document is processed according to the steps 218 to 242 set forth in FIG. 4. After processing the last page of the document at step 256, program control of the barcoder 2 returns to step 204 of the barcoder routine wherein the barcoder 2 waits for the receipt of a next document from the personal computer 4.

The barcoder 2 contains a modified parallel port 12 referred to herein as LPTIN1. To the personal computer 4, the LPTIN1 port will appear to be a standard printer parallel input port. The LPTIN1 port is addressed by the microprocessor 33 through a designated base address and a set of four adjacent addresses offset from the base address by 0, 1, 2 and 3 bytes. One may add additional input ports to the barcoder 2. The data, status and control registers for each additional port are designated by a distinct base address and corresponding offset addresses of 0, 1, 2 and 3 bytes.

After receiving an address in a document to which a barcode is to be inserted, the barcoder 2 processes the address information in the afore-described manner and appends a complete barcoded zip code to the document received from the personal computer 4 in accordance with the street address information. The barcoder 2 thereafter sends the modified document, including the barcoded zip code graphics, to the printer 6 for printing. Though the embodiment of the barcoder 2 described herein contains only a single source of documents, it is within the scope of the present invention to have a plurality of computers such as personal computer 4 attached to a plurality of input ports such as parallel input ports 12, 14 and 16 of the Barcoder 2. Furthermore, it is within the scope of the present invention to append any size ZIP CODE corresponding to the most complete ZIP CODE for a given valid street address available from a ZIP CODE database.

Turning now to FIG. 10, the interface between the personal computer 4 and the barcoder 2 emulates parallel data transfers between a personal computer and a printer. This minimizes disruption to the normal procedures for printing out documents containing barcoded ZIP CODE graphics on the printer 6. As is known in the art, pin 1 on both the parallel port 8 and the modified input parallel port 12 comprises the strobe line. Pins 2 through 9 of the parallel ports 8 and 12 comprise the Data 0 through Data 7 terminals for simultaneously transmitting a byte of data from the personal computer 4 to the barcoder 2 during data transfers.

Pins 10 and 11 on parallel ports 8 and 12 synchronize transfers of data from the personal computer 4 to the barcoder 2. Pin 10 in parallel ports 8 and 12 is reserved for an acknowledge signal transmitted by the barcoder 2 to the personal computer 4 indicating that the Barcoder 2 has received a byte of data from the personal computer 4. Pin 11 indicates when the barcoder 2 is receiving and processing data and can therefore not yet receive additional data. The signal on Pin 11 is therefore referred to as the "Busy" signal.

Pins 12, 13 and 14 on both ports 8 and 12 are reserved for well known printer control signals. Pin 12 informs the personal computer 4 when the paper bin of the printer 6 is empty. Pin 13, the "select" pin, enables the barcoder 2 to indicate to the personal computer 4 that the printer 6 is on-line. Pin 14 enables the personal computer 4 to signal the printer 6 to automatically feed another sheet of paper from the paper bin of the printer 6. The operation of Pins 12, 13 and 14 is well known to those skilled in the art.

A number of pins have been modified in the connection between ports 8 and 12 of the personal computer 4 and the barcoder 2 respectively. The lines between these pins have been re-routed in order to accommodate their modified operation. Pin 15, the error pin for the personal computer 4, receives a signal from the error pin 15 of the Barcoder 2 to indicate a malfunction of either the barcoder 2 or the printer 6. Pin 16, the "Reset Printer" pin for the personal computer 4, transmits a signal to Pin 16 the "initialize" pin on the Barcoder 2. Pin 17, the "Select In" signal for the personal computer 4, transmits a signal to pin 17 of the parallel port 12 to indicate that the barcode 2 is to be selected.

Both the parallel ports 8 and 12 contain a number of grounded pins. Pins 18–25 are grounded on port 8. Pins 18, 20, 22, 24, and 25, are grounded on port 12.

Figure 11A:
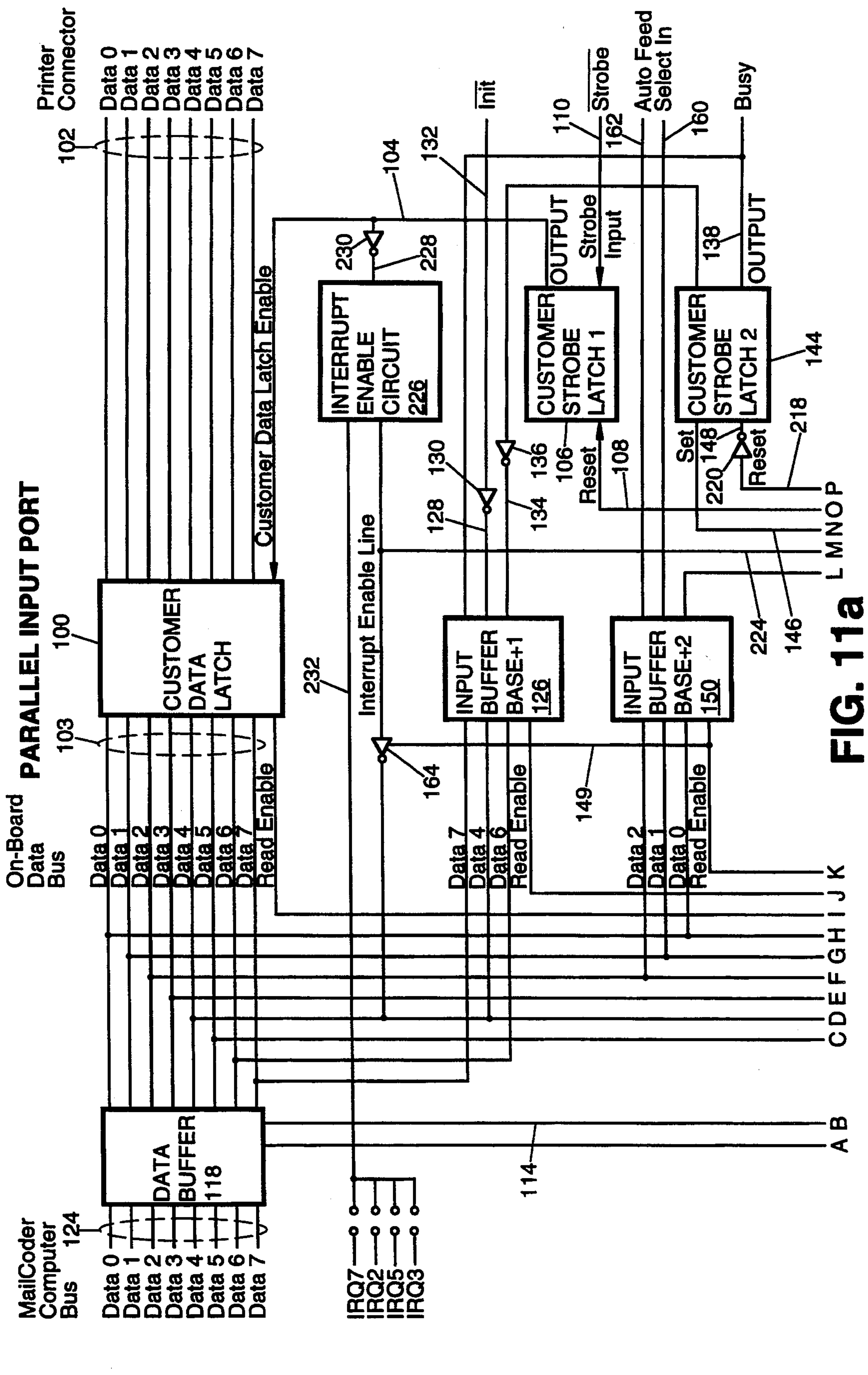
FIGS. 11*a* and 11*b* referred to collectively in the Detailed Description as FIG. 11 is a schematic block diagram of the parallel input port of the barcoder.
Figure 11B:
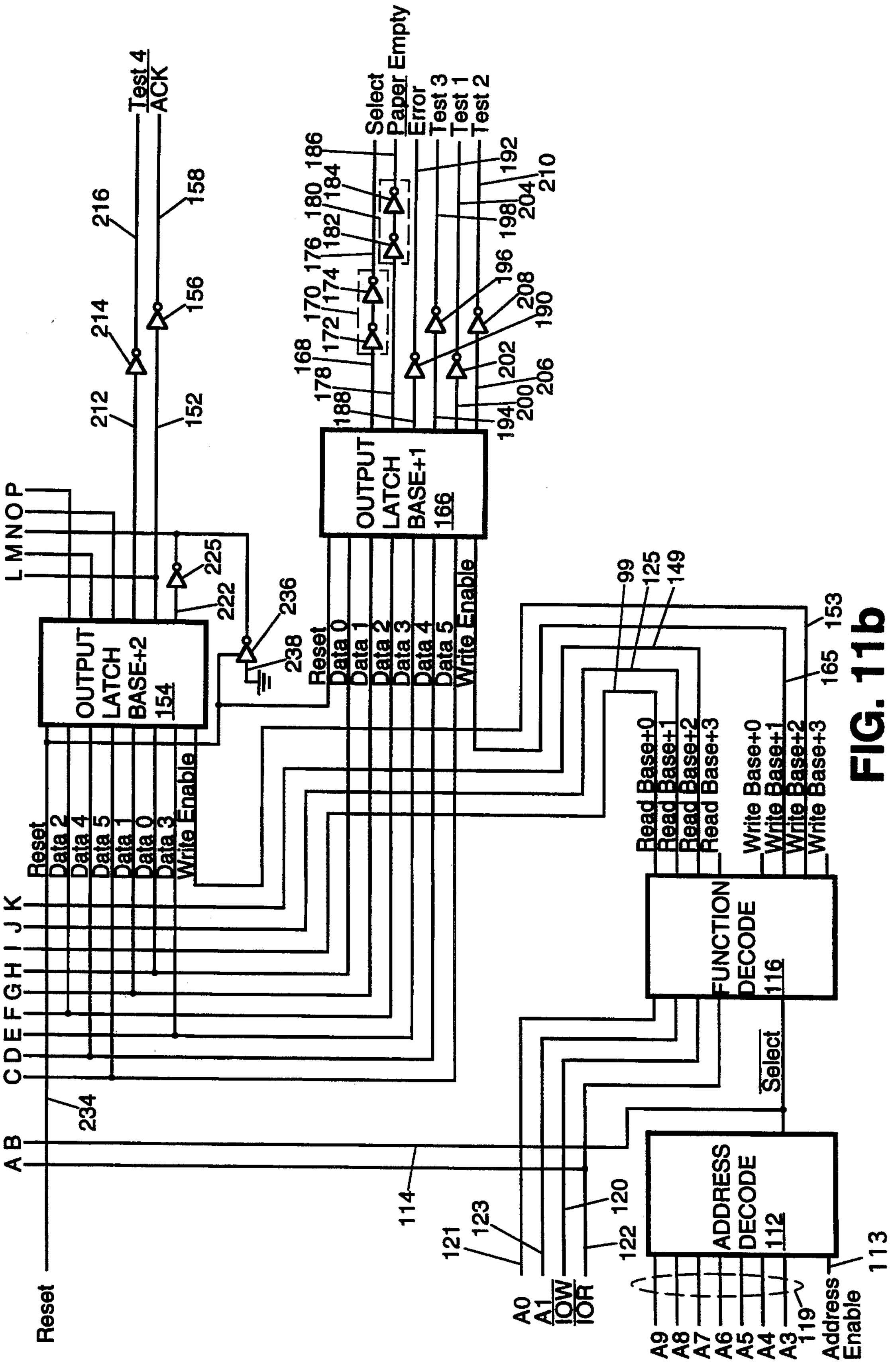

Having described the functions provided by the connector pins of the barcoder 2, attention is now directed to FIG. 11, a schematic illustration of the input parallel port 12 of the barcoder 2. The data latch 100 receives data from the parallel port 8 of the personal computer 4 through a set of eight data lines 102. The lines 102 coupled to pins 2 through 9 of the parallel port 12 connector carry a byte of data in parallel to a data latch 100. Data is accepted by the data latch 100 when an enable signal is received on line 104 from a strobe latch 106. The strobe latch 106 is reset by a signal from reset line 108 during initialization of the barcoder 2. The strobe latch 106 is set by the strobe line 110 from Pin 1 of the parallel port 12.

The "BASE" address comprises a predetermined address carried upon address lines 119 carrying the address signals A3 through A9, with an A0 signal on line 121 and an A1 signal on line 123 both set to logic zero. In the preferred embodiment, the BASE equals 0300H. If a decoder 112 has been activated by an address enable line 113 and address bits A3 to A9 of the BASE address are presented on lines 119 to the decoder 112, then the decoder 112 transmits a logic zero value on a $\overline{\text{Select}}$ line 114. The logic zero signal on line 114 is transmitted to a Functional Decoder 116 and a Data Buffer 118.

In addition to the select line 114, the Functional Decoder 116 receives additional control signals on an IOW (I/O Write enable) line 120 and $\overline{\text{IOR}}$ (I/O Read enable) line 122. When the select line 114 and the IOR line 122 are low and A0 and A1 on lines 121 and 123 respectively are both logic zero, then a Read_Base+0 signal on a line 99 is activated and the data latch 100 transmits the values stored within this 8-bit register on a set of lines 103 comprising lines Data_0 to Data_7 to the Data Buffer 118. When enabled by the $\overline{\text{Select}}$ line 114 and the $\overline{\text{IOR}}$ line 122, the data buffer 118 transmits the information on lines Data_0 to Data_7 to data bus lines 124 of the barcoder 2.

When the $\overline{\text{Select}}$ line 114 and the $\overline{\text{IOR}}$ line 122 are low and A0 is logic 1 and A1 is logic zero, then a Read$_{13}$ Base+1 signal on line 125 is activated and the buffer 126 transmits status information on lines Data_4, Data_6, and Data_7. The Data_4 output of the buffer 126 corresponds to input line 128 from invertor 130. The input line 132 of invertor 130 carries the $\overline{\text{Init}}$ signal from pin 16 of the parallel port 12. The Data_6 output of the buffer 126 corresponds to input line 134 from an invertor 136. The input line 110 of the invertor 136 carries the $\overline{\text{Strobe}}$ signal from pin 1 of the parallel port 12. The Data_7 output of the buffer 126 corresponds to input line 138. Line 138 is also coupled to Pin 11 of the parallel port 12 thereby providing the busy signal to the parallel port 8 of the personal computer 4.

The output signal of the strobe latch 144 on line 138 is set by a positive pulse transmitted on line 146 during start up of the barcoder 2. The output signal on line 138, which comprises the busy signal, prevents the personal computer 4 from sending data until the barcoder 2 is ready to receive data. A reset signal on line 148 resets the busy signal on line 138 when the barcoder 2 is ready to receive data.

When the select line 114 and the $\overline{IOR}$ line 122 are low and A0 is logic zero and A1 is logic one, then a Read_Base+2 signal on line 149 is activated and the buffer 150 transmits status information on lines Data_0, Data_1, Data_2 and Data_4. The Data_0 output of buffer 150 corresponds to input line 152 from an output latch 154. Line 152 carries the logic high or low value of the ACK signal to an inverting buffer 156. Line 158 carries the $\overline{ACK}$ signal to the personal computer 4 by means of Pin 10 of the parallel port 12.

The Data_1 output of the buffer 150 corresponds to input line 160 from Pin 17 of the parallel port 12. Pin 17 receives the Select_In signal from the personal computer 4. The operation and function of the Select_In signal are well documented in the area of printer/personal computer interfaces. The Data_2 output of the buffer 150 corresponds to input line 162 from Pin 14 of the parallel port 12. Pin 14 receives the Auto_Feed signal from the personal computer 4 in a manner known to those skilled in the art. The function and operation of the Auto_Feed signal is well documented in the printer art. When activated, the Read_Base+2 signal on line 149 also enables the output of inverting buffer 164. The output of the inverting buffer 164 is connected to the Data_4 line.

When the select line 114 and the $\overline{IOR}$ line 122 are low and A0 and A1 are both logic one, then a Read_Base+3 terminal is activated on the functional decoder 116. When the select line 114 and the $\overline{IOW}$ line 120 are low and A0 and A1 are both logic zero, then a Write_Base+0 terminal is activated on the functional decoder 116. When the select line 114 and the $\overline{IOW}$ line 120 are low and A0 and A1 are both logic one, then a Write_Base+3 terminal is activated on the functional decoder 116. In the present preferred embodiment of the invention, the Read_Base+3, Write_Base+0 and the Write_Base+3 terminals are not connected to any logic circuitry of the parallel port 12.

When the select line 114 and the $\overline{IOW}$ line 120 are low and A0 is logic one and A1 is logic zero, then the Write_Base+1 signal on line 165 is activated and data on lines Data_0, Data_1, Data_2, Data_3, Data_4 and Data_5 are written to latch 166. Line 168, corresponding to the Data_0 line input to the latch 166, carries the Select status signal to the output buffer 170 comprising a pair of serially connected inverting buffers 172 and 174. Line 176 carries the buffered Select signal to Pin 13 of the parallel port 12. Line 178, corresponding to the Data_1 line input to the latch 166, carries the Paper_Empty status signal to the output buffer 180 comprising a pair of serially connected inverting buffers 182 and 184. Line 186 carries the buffered Paper_Empty signal to Pin 12 of the parallel port 12. Line 188 corresponding to the Data_2 line input to the latch 166, carries the Error signal to the inverting buffer 190. Line 192 carries the $\overline{Error}$ signal to pin 15 of the parallel port 12.

Line 194, corresponding to the Data_3 line input to the latch 166, carries the Test_3 signal to the inverting buffer 196. Line 198 carries the inverted $\overline{Test\_3}$ signal to Pin 17 of the parallel port 12. Line 200, corresponding to the Data_4 line input to the latch 166, carries the Test_1 signal to the inverting buffer 202. Line 204 carries the inverted Test_1 signal to Pin 21 of the parallel port 12. Line 206, corresponding to the Data_5 line input to the latch 166, carries the Test_2 signal to the inverting buffer 208. Line 210 carries the inverted Test_2 signal to Pin 23 of the parallel port 12. The function of the Test_1, Test_2 and Test_3 lines is to provide feedback data for testing purposes with the use of a special loop-back test plug for port 12.

Test signals Test_1, Test_2, Test_3 and Test_4 are used in conjunction with a loop-back diagnostic connector (not shown) to facilitate the testing of input pins to verify the functionality of the input pins. Test_1 is looped back to pin 6 of the barcoder 2 which corresponds to the D4 input. Test_2 is looped back to pin 7 of the barcoder 2 which corresponds to the D5 input. Test_3 is looped back to pin 5 of the barcoder 2 which corresponds to the D3 input. Test_4 is looped back to pin 9 of the barcoder 2 which corresponds to the D7 input.

In addition to the "Test" signals described above, the loop-back connector routes the busy signal on pin 11 back to pin 1 which corresponds to the strobe input line. The select signal on pin 13 is routed to pin 2 which corresponds to the D0 input. The paper empty signal on pin 12 is routed to pin 3 and pin 16 corresponding to the D1 and INIT signals respectively. The Error signal on pin 15 is routed to pin 4 corresponding to the D2 input. The Acknowledge signal on pin 10 is routed to pin 8 corresponding to the D6 input. The looping back of these signals enables the testing of these signals to verify that they are able to reliably carry a high and a low signal. The loop back connection also enables the diagnostic technician to very the functionality of circuits which are affected by these signals. Other useful tests and test hardware would be known to those of ordinary skill in the art of computer diagnostics.

Returning again to the hardware, when the select line 114 and the $\overline{IOW}$ line 120 are low and A0 is logic zero and A1 is logic one, then the Write_Base+2 signal on line 153 is activated thus enabling data on lines Data_0, Data_1, Data_2, Data_3, Data_4 and Data_5 to be written to latch 154. Line 152, corresponding to the Data_0 line input to latch 154, carries the acknowledge signal described above. Line 212, corresponding to the Data_1 line input to latch 154, carries the Test_4 self-test signal to the inverting buffer 214. Line 216 from the inverting buffer 214 carries the inverted Test_4 signal to pin 19 of the parallel port 12. Line 218, corresponding to the Data_2 line input to latch 154, carries a signal for clearing the output of latch 144. The reset signal is carried on line 218 to an invertor 220. The output of invertor 220 is transmitted on line 148 to the reset input of the latch 144.

Line 222, corresponding to the Data_3 line input to latch 154, carries a signal for setting the output of latch 144 which in turn transmits a high signal on line 138 to Pin 11 of the parallel port 12. An invertor 225 receives the signal on line 222 and transmits the inverted received signal on line 146. Line 224, corresponding to the Data_4 line input to latch 154, carries a signal for enabling the interrupts by transmitting a signal to an interrupt enable circuit 226 known to those skilled in the art. Line 224 is also electrically coupled to invertor 164. An interrupt request signal is provided by line 228 from an invertor 230. The invertor 230 receives an interrupt request signal on line 104. The interrupt enable circuit 226 transmits an interrupt request signal on line 232 to the micro processor 33 in a manner known to those skilled in the art of computer design in order to interrupt the micro processor 33.

Line 108, connected to the output of the latch 154 corresponding to the Data_5 line input to the latch 154, carries a signal for clearing the interrupts with latch 106. As previous explained, the output signal on line 104, in addition to affecting the state of the interrupt circuit, enables the data inputs of the data latch 100. The interrupt request line 232 selectively requests an interrupt on lines IRQ2, IRQ3, IRQ5, and IRQ7 depending on which jumper is selected. The selective connecting of interrupts by means of jumpers is well known to those skilled in the area of computer design.

The parallel port 12 receives a reset signal on line 234 from the microprocessor 33. Line 234 carries the reset signal to the latches 154 and 166. Line 234 carries a signal to the enable input of an invertor 236. The input line 238 of the invertor is connected to ground. Therefore, when enabled by a reset signal on line 234, the invertor 236 transmits a logic high signal on line 146 to the latch 144 thereby setting the latch 144.

Though a preferred embodiment of the hardware for implementing the modified parallel port 12 of the barcoder 2 has been provided, it is within the scope of the present invention to make such modifications to the individual components of the parallel port 12 and the connections between the components as will be known to those of ordinary skill in the art in view of the above description.

Having described the components and physical connections of the parallel ports 8 and 12, attention is now directed to the manner in which the interconnected barcoder 2 and personal computer 4 interact to transfer a document to the barcoder 2 for verification of a proper address and to insert barcoded ZIP CODE graphics information. First, the initialization procedure for the Barcoder 2, and more particularly the parallel port 12, will be described. Then the communication protocol is described for transmitting a document from the personal computer 4 to the barcoder 2. After modifying a received document in accordance with the procedure described hereinabove, the barcoder 2 forwards the document to the printer 6 in accordance with standard computer/printer communication protocols. Though the preferred source and receiver interface includes the parallel ports, it is within the scope of the present invention to utilize any suitable interface port including, but not limited to, serial interface ports.

In order to properly receive encoded documents from the parallel port 8 of the personal computer 4, certain bits of the latches 154 and 166 of the parallel port 12 must be initialized. This causes certain output lines, including the Select line 176 and interrupt request line 232 as well as other status and control lines of the barcoder 2 to be set to their proper starting values. The procedure for initializing the latches 154 and 166 in order to create the proper ready state of the barcoder 2 for receiving a document from the personal computer 4 is described below.

After power has been supplied to the barcoder 2, the parallel port 12 is initialized for receiving documents from the parallel port 8 by writing predetermined values to the Write BASE+i latch 166 and the Write_BASE+2 latch 154. In the description below, a bit number corresponds to the data line at the input of an indicated latch. For example, Bit_0 corresponds to the bit of a latch having as its input Data_0. In the first step of the initialization procedure, the microprocessor 33 writes the following values to the latch 154 via the data lines 124, the data buffer 118 and finally the lines Data_0 to Data_7. Bit_0 of latch 154 is written with a low value causing $\overline{\text{ACK}}$ to remain high. Bit_2 of latch 154 is written with a high value resetting the strobe latch 144 which in turn ensures that the Busy Line 138 corresponding to Pin 11 of the port 12 is clear. Bit_3 of latch 154 receives a low value in order to leave the latch 144 in the non-set state. Bit_4 and Bit_5 of latch 154 receive a low value in order to guarantee that the interrupts are not enabled by the signal on line 232 from the interrupt enable circuit 226. Bit_1 of latch 154 receives a low signal to ensure that Test_4 is high. Bit_6 and Bit_7 are not used and therefore the values on the corresponding data lines 124 for those bits are inconsequential.

In the second step, after the values have been presented to the interface circuit 12, the microprocessor delays additional operations for 5 microseconds.

In the third step of the initialization procedure, the microprocessor 33 writes the following values to the latch 154 by means of the data line 124, the data buffer 118 and the lines Data_0 to Data_7. Bit$_{13}$0 of latch 154 is written with a low value causing $\overline{\text{ACK}}$ to remain high. Bit_2 of latch 154 is written with a low value thus completing the pulse for resetting the strobe latch 144. Bit_3 of latch 154 continues to receive a low value in order to hold the latch 144 in the non-set state. Bit_4 and Bit_5 of latch 154 receive high values in order to enable the interrupts by means of the interrupt enable signal on line 224 from the interrupt enable circuit 226.

During step four, operations are delayed for an additional 5 microseconds.

During step five the microprocessor 33 writes certain values to the latch 166 by means of the data lines 124, the data buffer 118 and finally the lines Data_0 to Data_7. Bit_0 of latch 166 is written with a high value causing the Select line 176 to signal the printer 6 to switch on-line. Bit_1 of latch 166 receives a logic low value which maintains a low value on the Paper Empty status line 186. Bit_2 of latch 166 receives a logic low value which causes a logic high value to be transmitted on the $\overline{\text{Error}}$ status line 192. Bit_3, Bit_4 and Bit_5 of latch 166 receive a logic low value which produces logic high values on the Test_3 line 198, the Test_1 line 204, and the Test_2 line 210. Bit_6 and Bit_7 are not used and therefore the values on the corresponding data lines 124 for those bits are inconsequential.

After completion of step five, the barcoder 2 is ready to receive encoded documents from the personal computer 4, to identify and verify the accuracy of an address, make any necessary changes to the ZIP CODE as described hereinabove, insert graphics data corresponding to a complete barcoded ZIP CODE, and finally forward the verified and modified document to the printer 6.

FIG. 12 shows an illustrative timing sequence for signals involved in the transfer of data from the personal computer 4 to the barcoder 2. First, an 8 bit byte of data is placed on Pins 2 to 9 of the port 8. The 8 bits are transferred simultaneously to the Pins 2 to 9 of the parallel port 12 which are connected to the input data lines 102. At least 5 microseconds after the data bits on Pins 2 to 9 are valid, the personal computer 4 sets the $\overline{\text{Strobe}}$ line 110, corresponding to Pin 1 of the parallel port connectors, low. The $\overline{\text{Strobe}}$ line 110 remains low for at least 5 microseconds. The low strobe signal on line 110 indicates to the barcoder 2 that Pins 2 to 9 of parallel port 8 are presently transmitting valid data. In order to guarantee that valid data is stored in latch 100, the data lines 102 continue to hold valid data for at least 5 microseconds after the rising edge of the strobe signal on line 110.

The strobe signal on line 110 provides three functions. One, the strobe signal causes the data latch 100 to receive and store the data values on lines 102 for a period which lasts at least until the microprocessor 33 can retrieve the data. Two, the strobe signal, through the latch 106, triggers the hardware interrupt to commence the execution of the data handling interrupt. The latch 106 holds the interrupt request until it can be serviced by data input interrupt handling routines of the microprocessor 33. Third, the strobe signal, through the latch 144, sets the busy line 138 which prevents the personal computer 4 from sending more data until the barcoder 2 is ready to receive another byte of data from the parallel port 8 of the personal computer 4.

The data input interrupt routine for buffering the received document is executed for each byte of information transferred from the personal computer 4 to the Barcoder 2. The following is a summary of the data handling interrupt routine for the barcoder 2 receiving a document from the personal computer 4. First, the interrupt routine disables all maskable interrupts in a known manner. Next, the microprocessor 33 reads the byte of data stored in the latch 100 at the address corresponding to Read_Base+0. The byte of data is thereafter buffered by the microprocessor in a prearranged location in the RAM 34.

After storing a received byte of data, the barcoder 2 writes the value F5 hex to the Write_BASE+2 latch 154. The resulting output signals from the latch 154 reset the latch 144. The low output signal from the latch 144 is transmitted on line 138 to output Pin 11 of the parallel port 12. The low busy signal on Pin 11 indicates to the personal computer 4 that the barcoder 2 is ready to receive another byte of data from the personal computer 4. The high value on line 152 from the latch 154 causes the $\overline{\text{ACK}}$ line on Pin 10 to go low.

After completing a 2.0 microsecond delay, the Barcoder 2 writes the value D1 hex to the Write_BASE+2 latch 154. The resulting output signals from the latch 154 reset the latch 106 by causing a low value to be transmitted on line 108 corresponding to the Data_5 input line to latch 154. The $\overline{\text{ACK}}$ line continues to transmit a low signal on PIN 10.

After completing a 5 microsecond delay, the barcoder 2 writes the value F1 hex to the Write_BASE+2 latch 154. The resulting output signals from the latch 154 clear the busy line reset signal on line 218 while keeping the $\overline{\text{ACK}}$ line low.

After completing a second 5 microsecond delay, the barcoder 2 writes the value F0 hex to the Write_BASE+2 latch 154. The resulting output signals from the latch 154 clear the interrupt enable reset signal on line 108 and returns the $\overline{\text{ACK}}$ signal on line 158 to a high value.

Finally, the Barcoder enables the interrupts by placing a logic high state on line 224.

After the entire document is received and stored by the barcoder 2, the string of received bytes of data is checked to determine whether the received electronically encoded document contains an address. If the barcoder 2 detects an address within the document, the barcoder 2 executes the afore-described procedures for verifying an address, correcting an incorrect or incomplete ZIP CODE, determining that sufficient room exists in the hard copy version of the document for inserting barcoded ZIP CODE graphics, and inserting the barcode graphics data into the electronically encoded document. While the address is being processed and the appropriate graphics are inserted in an electronically encoded document, the barcoder 2 prevents data transmission between the personal computer 4 and the barcoder 2 by causing the Busy to be active high upon reception of a strobe pulse from personal computer 4. Pin 11 of the parallel port transmits the Busy signal to the personal computer 4. Setting of the latch 144 occurs by transmitting a low signal on line 146.

A method and apparatus have been described for identifying and inserting within a document a complete, correct barcoded ZIP CODE based upon the address information contained within the document. Though a preferred embodiment of the invention has been provided, modifications to the above described invention would be known to one of ordinary skill in the art in view of this description. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

What is claimed is:

1. A system for intercepting an electronically encoded print-ready document, said electronically encoded print-ready document including mailing address information, and appending a complete barcoded ZIP CODE to the electronically encoded print-ready document in accordance with the mailing address information, said system comprising:

an input port coupled to a word processing system for receiving said electronically encoded print-ready document from the word processing system;

means for identifying said mailing address information within said electronically encoded print-ready document;

means for retrieving a complete ZIP CODE in accordance with said mailing address information;

means for inserting barcode graphics data into said electronically encoded print-ready document, said barcode graphics corresponding to said complete ZIP CODE, in order to create an electronically encoded modified print-ready document; and an output port for transmitting said electronically encoded modified print-ready document to a printer.

2. A method for appending ZIP CODE barcode graphics data to an electronically encoded print-ready document, said electronically encoded print-ready document including a mailing address, said method comprising the steps of:

receiving, from a word processing system, the electronically encoded print-ready document;

identifying the mailing address within the electronically encoded print-ready document;

retrieving a complete ZIP CODE in accordance with the identified mailing address;

inserting barcode graphics data into the electronically encoded print-ready document, said barcode graphics corresponding to the complete ZIP CODE, in order to create an electronically encoded modified print-ready document; and transmitting the electronically encoded modified print-ready document to a printer.

3. A system for appending ZIP CODE barcode graphics data to a plurality of bit patterns transmitted from a personal computer, said plurality of bit patterns comprising an electronically encoded print-ready document containing a mailing address, the system comprising:

an input port communicatively coupled to the personal computer for receiving the plurality of bit patterns;

an index for designating a complete ZIP CODE corresponding to the mailing address;

a microprocessor-based device for (1) identifying a bit pattern within the plurality of bit patterns corresponding to the mailing address, (2) retrieving a complete ZIP CODE corresponding to the mailing address from the index, and (3) creating a modified plurality of bit patterns by inserting into the plurality of bit patterns a barcode graphics bit pattern representing barcode graphics data corresponding to the complete ZIP CODE; and means for transmitting to a printer the modified plurality of bit patterns.

4. The system of claim 3 wherein the plurality of bit patterns further comprises a header bit pattern, and wherein the microprocessor based device includes means for controlling the execution of the identifying and creating functions in accordance with the header bit pattern.

5. The system of claim 4 wherein the header bit pattern includes a bit pattern designating a maximum number of mailing addresses within the plurality of bit patterns for which the microprocessor-based device may generate and insert barcode bit patterns.

6. The system of claim 4 wherein the header bit pattern includes a bit pattern for instructing the microprocessor-based device where to search for a bit pattern corresponding to the mailing address while performing the identifying function.

7. The system of claim 4 wherein the header bit pattern includes a bit pattern for instructing the microprocessor-based device where to insert the barcode graphics bit pattern in relation to a bit pattern comprising the mailing address in the modified plurality of bit patterns.

8. The system of claim 5 wherein the header bit pattern includes a bit pattern for instructing the microprocessor-based device where to search for a bit pattern corresponding to a mailing address while performing the identifying function.

9. The system of claim 3 wherein the electronically encoded print-ready document includes an incomplete ZIP CODE, and wherein the retrieving function performed by said microprocessor-based device comprises retrieving a complete ZIP CODE corresponding to the mailing address.

10. The system of claim 3 wherein the electronically encoded print-ready document includes an incorrect ZIP CODE; and wherein the retrieving function performed by said microprocessor-based device comprises retrieving a correct complete ZIP CODE for the electronically encoded print-ready document.

11. The system of claim 3 wherein said input port comprises a parallel input port.

12. The system of claim 3 wherein said input port comprises a modified parallel input port including a set of input pins for facilitating control of a printer, said set of input pins including an auto feed pin.

13. The system of claim 12 wherein said input port is equivalent in function to the Centronics (Registered Trademark) parallel printer interface port.

14. The system of claim 1 wherein said electronically encoded print-ready document is a letter.

15. The system of claim 1 wherein said electronically encoded print-ready document is an envelope.

16. The system of claim 1 further comprising a CD ROM including a database of complete ZIP CODES corresponding to said mailing address information.

17. The system of claim 1 wherein said means for retrieving includes means for parsing the mailing address information into at least city, and state fields.

18. The method of claim 2 further comprising the step of parsing the mailing address into at least city, and state fields; and wherein the retrieving step comprises retrieving the complete ZIP CODE in accordance with the contents of at least the city and state fields.

19. The method of claim 18 wherein the electronically encoded print-ready document includes an incomplete ZIP CODE.

20. The method of claim 18 wherein the electronically encoded print-ready document includes an incorrect ZIP CODE; and wherein the retrieving step comprises retrieving a correct complete ZIP CODE for the electronically encoded print-ready document.

* * * * *